United States Patent
Köbrich

[11] Patent Number: 6,118,107
[45] Date of Patent: Sep. 12, 2000

[54] PROCESS AND DEVICE FOR IN-SERVICE MEASUREMENT OF TEMPERATURE IN AT LEAST ONE COOKING ZONE OF A COOKING AREA WITH A GLASS CERAMIC PLATE

[75] Inventor: Holger Köbrich, Flörsheim, Germany

[73] Assignee: Schott Glas, Mainz, Germany

[21] Appl. No.: 09/000,847

[22] Filed: Dec. 30, 1997

[30] Foreign Application Priority Data

Dec. 31, 1996 [DE] Germany ............................. 196 54 773

[51] Int. Cl.[7] ........................................................ H05B 1/02
[52] U.S. Cl. ........................ 219/502; 219/497; 219/449; 219/443; 374/130; 374/120
[58] Field of Search ..................... 219/443–461, 219/497, 494, 501, 502; 374/120–132

[56] References Cited

U.S. PATENT DOCUMENTS

| | | | |
|---|---|---|---|
| 4,740,664 | 4/1988 | Payne et al. ............................ | 219/449 |
| 4,851,645 | 7/1989 | Wolf et al. ............................. | 219/464 |
| 5,170,041 | 12/1992 | Amith et al. ............................ | 219/497 |
| 5,460,451 | 10/1995 | Wadman ................................. | 219/502 |

FOREIGN PATENT DOCUMENTS 0 111 853  6/1984  European Pat. Off. .

OTHER PUBLICATIONS

Jeryan et al., *Journal of the American Ceramic Society*, "Optical Method of Measuring Temperature in Hot Glass", Jan. 1972, pp. 71–73.

*Primary Examiner*—Mark Paschall
*Attorney, Agent, or Firm*—Millen, White, Zelano & Branigan

[57] ABSTRACT

A process and cooking area for in-service measurement of temperature in at least one cooking zone of the cooking area with a glass ceramic plate is based on an empirically derived correlation between transmission of light through the glass ceramic plate in a wavelength range of a temperature that is typical of the respective glass ceramic material. The process includes irradiation of the glass ceramic plate in the cooking zone from the inside toward the outside with light in the wavelength range of 700–1500 nm, with the light being reflected at the outer surface of the glass ceramic plate and passing through the glass ceramic plate a second time. Detection of reflected light with a photocell, generates a photocurrent that corresponds to the transmission of the glass ceramic plate in the cooking zone. The temperature of the cooking zone is derived from the derived correlation between the transmission of light of the specified wavelength and the temperature of the glass ceramic plate.

19 Claims, 3 Drawing Sheets

PROCESS AND DEVICE FOR IN-SERVICE MEASUREMENT OF TEMPERATURE IN AT LEAST ONE COOKING ZONE OF A COOKING AREA WITH A GLASS CERAMIC PLATE

FIELD OF THE INVENTION

The invention relates to a process for in-service measurement of temperature in at least one cooking zone of a cooking area with a glass ceramic plate. The invention further relates to a cooking area with a corresponding device.

BACKGROUND OF THE INVENTION

When areas of a glass ceramic plate are exposed to large temperature changes during operation, for a wide variety of reasons it is necessary to know the temperatures in these areas. Typically, in the case of cooking areas with glass ceramic plates as cooking surfaces, the temperature in the cooking zone must be monitored continuously during operation. When the temperature/time load capacity of the glass ceramic plate is exceeded, the latter may break. The temperature must also be detected to regulate the output of the cooking zone.

The temperature of the glass ceramic plate in the cooking zone is usually monitored with the aid of a rod expansion regulator. Such an arrangement has been disclosed by, for example, EP 0 394 693. The corresponding expansion-rod temperature sensor is mounted several millimeters from the lower side of the glass/glass ceramic plate and thus does not directly detect the temperature that prevails at the measuring site (cooking zone).

Consequently, it reacts only with a time lag and, in many cases, responds incorrectly to changes in temperature.

There are also proposals to use the infrared radiation of the lower side of the hot glass ceramic plate to determine temperature. In the sample application, the conversion did not work because the coil of the heating unit that heats up the cooking zone radiates at the same wavelength and distorts the information signal.

SUMMARY OF THE INVENTION

The object of the invention is to implement the process indicated above or to design the corresponding device in such a way that the actual temperature of the glass ceramic plate in the cooking zones in question can be detected by simple means.

This object can be accomplished according to the invention for the process based on an empirically derived correlation between the transmission of light through the glass ceramic plate in a wavelength range of the temperature that is typical of the respective glass ceramic material, with the steps:

irradiation of the glass ceramic plate in the cooking zone from the inside toward the outside with light in the wavelength range of 700–1500 nm, with the light being reflected at the outer surface of the glass ceramic plate and passing through the glass ceramic plate a second time, detection of the reflected light with a photocell, generating a photocurrent that corresponds to the transmission of the glass ceramic plate in the cooking zone, and determination of the temperature of the cooking zone from the correlation noted between the transmission of light of the specified wavelength and the temperature of the glass ceramic plate.

With regard to the above-indicated cooking area with the corresponding device, this object according to the invention can be accomplished based on an empirically derived correlation between the transmission of light through the glass ceramic plate at a wavelength range of the temperature that is typical of the respective plate material, with A light source that is arranged below the glass ceramic plate and that emits light at a wavelength in the range of 700–1500 nm, optical elements for irradiating the glass ceramic plate in the cooking zone from the inside toward the outside with the emitted light, a reflector on the outside surface of the plate in the cooking zone to reflect light so that it passes through the plate a second time, a photocell arrangement and optical elements that are placed upstream to detect reflected light, which generates a photocurrent that corresponds to the transmission of the glass ceramic plate in the cooking zone, and an analysis stage for the photocurrent to determine the temperature of the cooking zone from the noted correlation between the transmission of light of the prescribed wavelength and the temperature of the glass ceramic plate.

The invention exploits the effect that a rise in the temperature in the cooking zone leads to a decrease in the transmission of the glass ceramic material in a specific wavelength range. The transmission in this case is manifested in a corresponding photocurrent from which the latter can be determined via the previously determined correlation between transmission and temperature.

With the process according to the invention as well as with the corresponding device, the actual temperature of the glass ceramic plate in the cooking zone in question is measured. As a result, on the one hand, overheating is prevented; on the other hand, the load capacity of the glass ceramic plate can be exploited to the fullest, and the food can be heated up quickly.

According to a design feature of the invention, the radiated light is timed using devices that are known in the art, and temperature is determined by analyzing the timed reflected light.

As a result, the information signal can be separated very advantageously from perturbing radiation, such as radiation from the heating unit or the surface of the hot glass ceramic plate.

By appropriately arranging optical elements, such as fiber optic light guides or mirrors or photocells, the temperature in the cooking zone in question can be detected in a local or area manner. Area detection results in a temperature mean in the range in question; conversely "hot spots" can be better detected with local temperature detection.

As a light source, preferably a light-emitting diode that irradiates light in a comparatively defined spectral region and that can be timed electronically in a simple way is used. In principle, incandescent lamps can also be used. As a photocell, preferably a phototransistor or a photodiode that ensures accurate conversion of the transmission into a corresponding photocurrent is used.

DE 31 17 205 A1 discloses an optoelectronic cooking zone control in the case of a glass ceramic plate as a cooking surface, with a light transmitter and a light receiver that are arranged below the glass ceramic plate in such a way that they detect the size, i.e., the diameter of the cooking device that is placed on the cooking zone. They are hooked up to a heating circuit control for the cooking zone in such a way that more or fewer heating circuits can be turned on depending on the diameter of the cooking device.

This is thus a pot detection system with heating circuit control of the corresponding surface that is to be heated.

With the known arrangement, however, the temperature in the cooking zone is not detected. For this purpose, separate, and preferably the above-described, temperature sensors are provided.

A way is also known ("Optical Method of Measuring Temperature in Hot Glass" from Journal of the American Ceramic Society, Vol. 55, No. 2, pages 71–73) for determining the temperature in a glass melt, which is on the order of 1,000° C. (1,300° C.) so that a laser light irradiates the glass melt and the temperature-dependent change of the monochromatic absorption coefficient is determined. This process is described only for high-temperature glass, however.

EP 0 111 853 also discloses a type of indirect temperature measurement in which the temperature-dependent light absorption is determined in a special semiconductor material, which forms the detector; to accomplish this, the detector must be brought into close thermal contact with the body whose temperature is to be measured. In the case of the invention, however, direct measurement is provided since a cooking zone in the glass ceramic plate whose temperature is to be determined is irradiated indirectly with the "measuring light."

BRIEF DESCRIPTION OF THE DRAWINGS

Other design features and advantages of the invention are indicated by embodiments of the invention that are depicted in the drawings. As a sample application, typically a cooking area with a glass ceramic plate was selected as a cooking surface that has at least one heated cooking zone.

Here.

DETAILED DESCRIPTION

Figure 1:
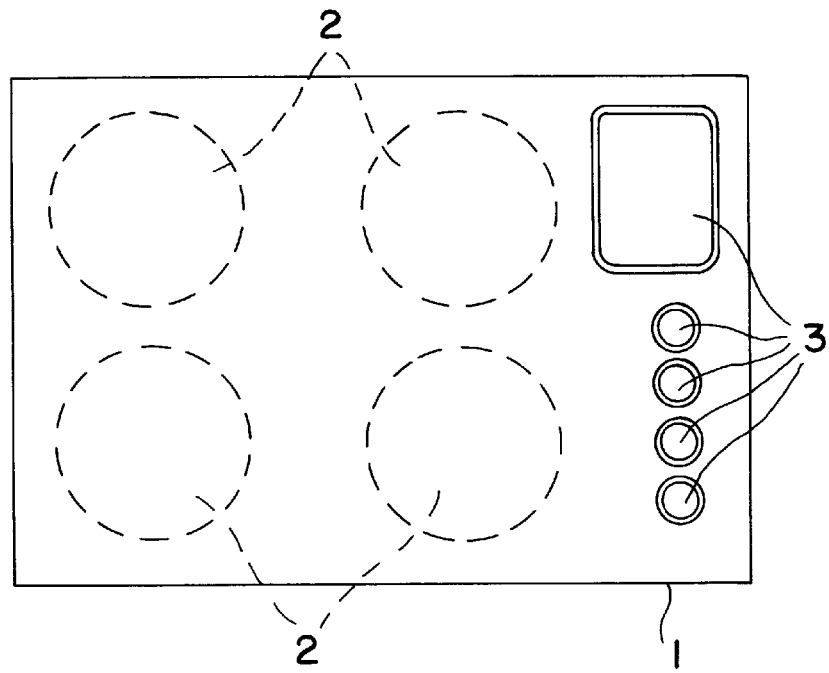
FIG. 1 shows, in a top view, a diagrammatic visualization of a common cooking area with its cooking zone.

FIG. 1 shows, in a diagrammatic visualization in top view, a cooking area with a cooking surface 1 that is made of glass ceramic material, which is marketed under the trademark CERAN®, which has four cooking zones 2. The number of cooking zones is only given by way of example. The cooking surface can have any common number of cooking zones of common design.

The above-indicated material also corresponds to a preferred design. Other glass materials that are suitable for use as cooking surfaces can also be used.

Examples of recessed functional zones 3 are on the right side of cooking surface 1. In the design according to FIG. 1, the spatial position of functional zones 3 is indicated only by way of example. They can also be concentrated in a functional area. They can also be arranged in a dispersed manner, however, over the entire cooking surface.

In each case, a functional element, not shown, such as a switch or the like, in cooking area 1 is assigned to functional zone 3. This design is known and therefore does not need to be explained in greater detail.

Figure 2:
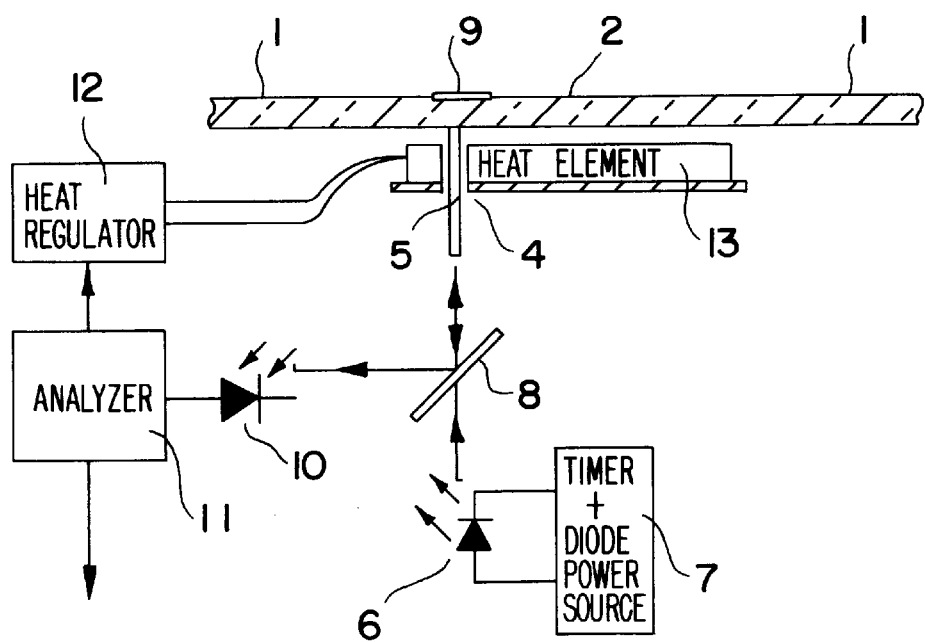
FIG. 2 shows, in a diagrammatic visualization, a first embodiment of a device for in-service detection of temperature in at least one of these cooking zones, with the light paths being guided according to the autocollimation principle.

In a diagrammatic side view, FIG. 2 shows one of these cooking zones 2 of the cooking area according to FIG. 1 on an enlarged scale with an embodiment of a device for in-service detection of temperature in at least one of the cooking zones, preferably in all cooking zones, at least with respect to temperature monitoring. For cooking zones with regulation of output, the starting temperature signal of the device is additionally fed to the control circuit.

A heating element 13, whose output is to be adjustable in this embodiment, is arranged below cooking zone 2 of glass ceramic plate 1. An opening 4, through which a fiber optic light guide 5 is run, is in the bottom of heating unit 13. A light source, in this example in the form of a light-emitting diode 6, which in the selected example emits light with a well-defined wavelength with a half-width value of 50 nm, is further below glass ceramic plate 1. The wavelength of the maximum emission can be selected in the range of 700–1500 nm by selecting the type of light-emitting diode. In this wavelength range, the transmission of the glass ceramic plate that is used is especially strongly dependent on its temperature.

Figure 4:
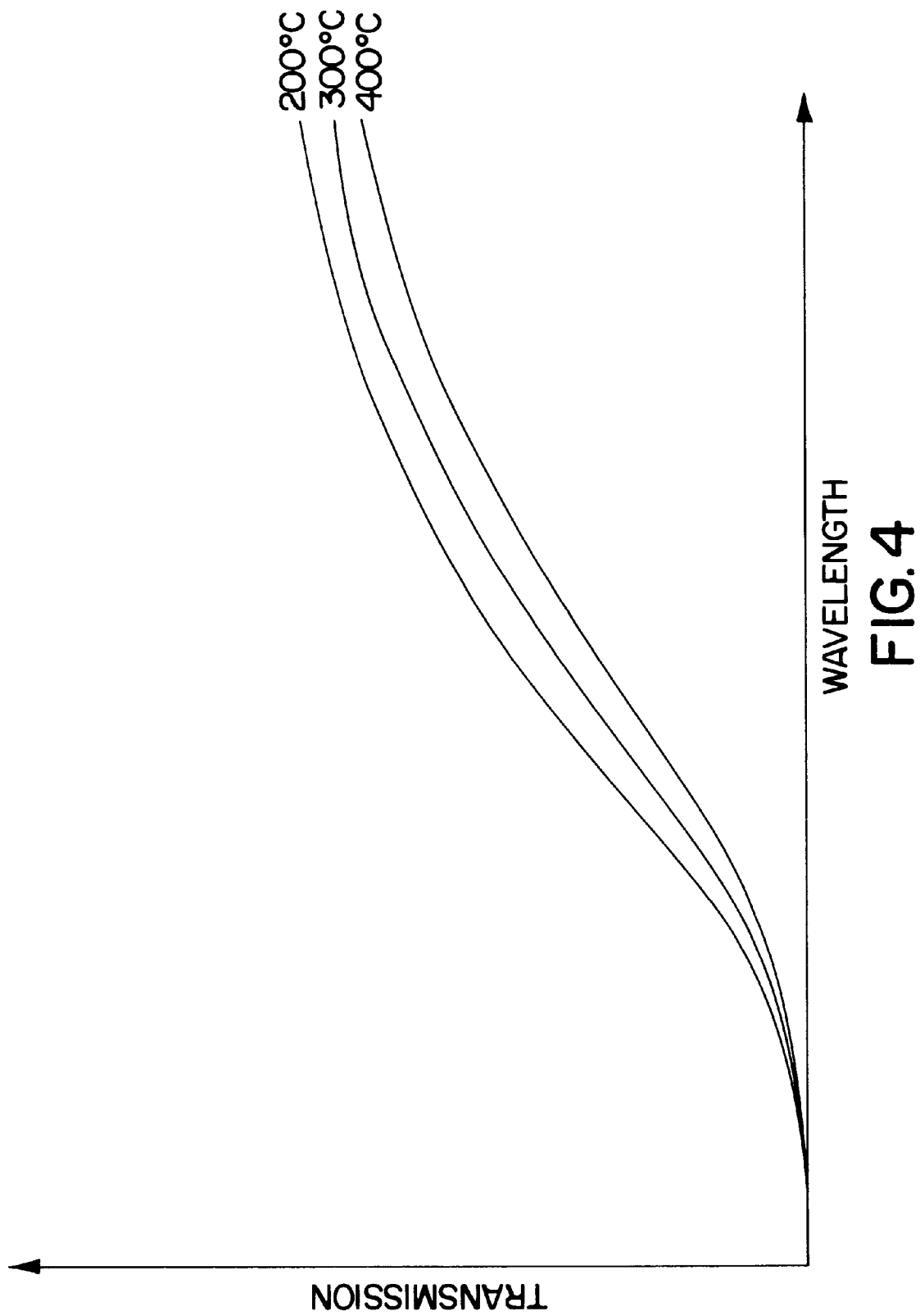
FIG. 4 shows the empirically derived correlation between the transmission of light by specific glass ceramic materials, wavelength, and temperature.

This correlation between the transmission of the light that goes through a specific glass ceramic material, its wavelength, and the temperature of the glass ceramic material is depicted in FIG. 4. This figure shows an empirically derived family of curves that document the dependence of transmission on wavelength for three different temperatures (200° C., 300° C. and 400° C.). This dependence is the basis of the temperature measurement according to the invention, whereby a specific curve is to be plotted for each material.

Instead of the light-emitting diode, other light sources that radiate light in the indicated wavelength range, e.g., incandescent bulbs, can also be used. For other glass ceramic materials, light-emitting diodes in the appropriate wavelength range can be used.

Light-emitting diode 6 is connected to an electronic circuit 7, which supplies the diodes and with which at the same time the light that is emitted by the diode can be timed by known means.

In the preferred embodiment, the light that is emitted by light-emitting diode 6 is guided via a semi-reflecting mirror 8 to fiber optic light guide 5, then passes through glass ceramic plate 1 in cooking zone 2 from the bottom upward, is reflected back at a reflector 9 that is attached to the outer surface of glass ceramic plate 1, and in the process passes through glass ceramic plate 1 the second time. The reflector can be made by a locally applied metal reflection layer or by a decorative element.

The reflected light then passes via semi-reflecting mirror 8 to a photocell 10, which is provided by a photodiode in this example. The other known light-sensitive receivers such as phototransistors or the like can also be used, however.

Photocell 10 generates a photocurrent that is largely proportional to the temperature-dependent transmission of glass ceramic plate 1 that is depicted in FIG. 4. This photocurrent is fed to an analysis stage 11, in which the temperature of the cooking zone is calculated in connection with the specified correlation, which is established in the analysis stage, between the transmission of light, its wavelength, and the temperature of glass ceramic plate 1 according to FIG. 4.

In this case, the analysis stage is designed in such a way that it analyzes the photocurrent in the cycle of the emitted light and in the timing pause and filters out the information signal from the difference.

Analysis stage 11 is therefore basically a computing circuit, which is implemented especially by a microprocessor.

The temperature value that is determined can, as indicated by the lower arrow in stage 11, be displayed with known means and/or fed to an alarm device (not shown), which sets off an alarm when a temperature limit is exceeded. Moreover, the temperature measurement signal can be fed to a stage 12 by which the heat output can be shut off and regulated. Shut-off occurs if, for example, the temperature signal exceeds a limit; conversely, in the case of adjustment, the temperature signal is used as an actual value for output adjustment. Such an arrangement, whereby the temperature signal is used for control/adjustment of the temperature of the glass ceramic cooking zone and to protect the cooking zones from overheating, is disclosed by DE 40 22 845 C2 and DE 40 22 846 C2.

Other possible applications for the temperature signal will be presented later.

Figure 3:
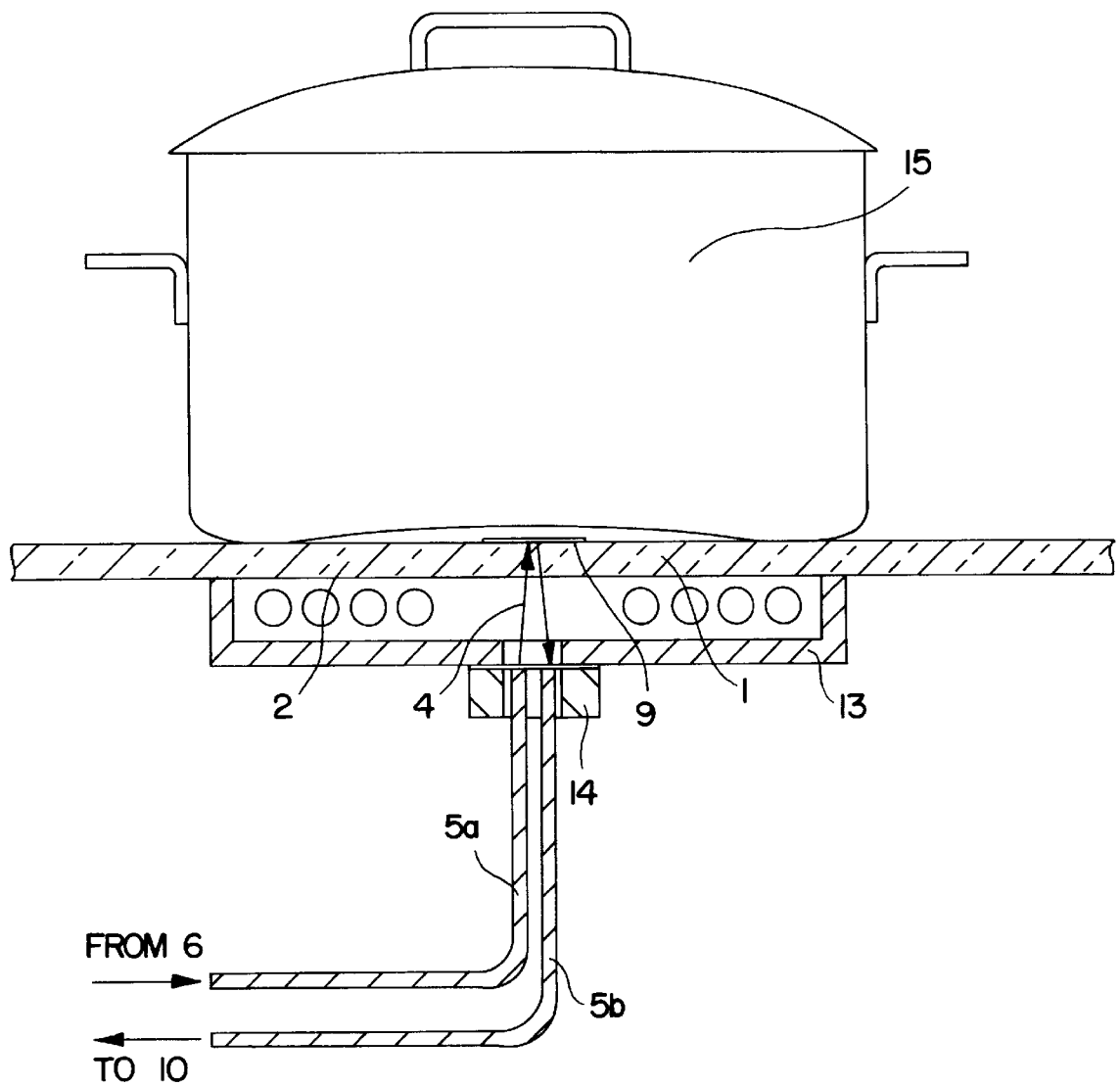
FIG. 3 shows, in a diagrammatic visualization, a second embodiment of a corresponding device with separate light paths.

In the embodiment depicted, light is reflected back (autocollimation principle). The device can, however, also be designed in such a way that for the irradiated light and for the reflected light, two different optical paths and corresponding fiber optic light guides are provided. Such a design is depicted in FIG. 3. Identical elements are given the same references. FIG. 3 shows two fiber optic light guides, a fiber optic light guide 5a for the light exiting light-emitting diode 6 that goes out through opening 4 into heating element 13 and through glass ceramic plate 1 to then be thrown back at reflector 9 at a certain angle, and a second fiber optic light guide 5b for the reflected light that is guided to photocell 10. Both fiber optic light guides 5a and 5b are mechanically attached in a cuff-like holder 14 to the underside of heating element 13. To ensure realistic visualization, a pot 15 in cooking zone 2 is also shown in this case.

Instead of the fiber optic light guide shown in FIGS. 2 and 3, optical arrangements with mirrors and focusing components can also be used.

In the design according to FIG. 2 and FIG. 3, the optical elements are designed and the photocell arrangement is made in such a way that the temperature of cooking zone 2 can be detected in a limited local area.

It is also possible for the optical elements to be designed and the photocell arrangement to be made in such a way that the temperature of the cooking zone is detected in an area manner.

This embodiment can be produced by having the photocell arrangement have several photocells, which in each case are assigned to a specific local area of the cooking zone, and the temperature of the cooking zone can be determined by a comparative analysis of the individual photocurrents in the analysis stage. Using this analysis, a temperature profile can also be shown to detect anomalous thermal load conditions in the cooking zone and to be able to take measures corresponding to DE 40 22 844 C1.

Another embodiment is conceivable in which the photocell arrangement has a single photocell to which are assigned as optical elements several fiber optic light guides that are directed to different local areas of the cooking zone.

By inserting an electronic multiplexer, a temperature profile can also be plotted in this embodiment.

Area temperature detection is also possible with a device in which the photocell arrangement has a single photocell and, as an optical element, a movable mirror is provided that deflects the emitted light to different local areas of the cooking zone and guides the light that is reflected to the photodetector.

Owing to the relatively harsh ambient conditions and with a view to ensuring low susceptibility to interference, however, the embodiments with static optical elements are preferred.

In FIGS. 2 and 3, in each case a reflector layer 9 is depicted at which the light that goes through glass ceramic plate 1 is reflected. It is basically conceivable, in this respect, also to use the inherent reflection on the top side of glass ceramic plate 1. With use of a reflector layer, however, the signal is more pronounced.

In the extreme case, a very high temperature load can occur, so that there is a danger of the glass ceramic plate breaking. In the course of this process, the transmission of the glass ceramic material is reduced. There thus exists the possibility of analyzing the temperature signal in stage 11, of storing the minimum and maximum values of transmission namely in another stage depending on the type of dosimeter, and of using the data as a measure of the aging of the glass ceramic plate.

It is also conceivable to analyze the temperature signal in such a way that a display is possible whether a pot is on cooking zone 2 of glass ceramic plate 1 or not, since the temperature of the cooking zone will be different in the case of the same heat output.

It is also possible to feed the temperature signal to a display device corresponding to DE 43 17 040 A1, which quantitatively displays to the user the heat output that is available in the respective cooking zone.

Heating element 13 is preferably an element that can be heated up with electrical energy. It can also be an element in a gas-heated system or an element that heats inductively, however.

All patents, patent applications and publications recited herein are hereby incorporated by reference in their entirety.

From the foregoing description, one skilled in the art can easily ascertain the essential characteristics of this invention and, without departing from the spirit and scope thereof, can make various changes and modifications to the invention to adapt it to various usages and conditions.

What is claimed is:

1. A process for in-service measurement of temperature in at least one cooking zone of a cooking area with a glass ceramic plate based on an empirically derived correlation between the transmission of light through the glass ceramic plate in a wavelength range of the temperature that is typical of the respective glass ceramic material, with the steps:

irradiation of the glass ceramic plate in the cooking zone from the inside toward the outside with light in the wavelength range of 700–1500 nm, with the light being reflected at the outer surface of the glass ceramic plate and passing through the glass ceramic plate a second time, detection of reflected light with a photocell, generating a photocurrent that corresponds to the transmission of the glass ceramic plate in the cooking zone, and determination of the temperature of the cooking zone from the derived correlation between the transmission of light of the specified wavelength and the temperature of the glass ceramic plate.

2. A process according to claim 1, wherein the irradiated light is chopped to provide light pulses and the temperature is determined by analysis of the chopped light that passes through the glass ceramic plate.

3. A process according to claim 2, wherein the temperature in the cooking zone is detected locally.

4. A process according to claim 2, wherein the temperature in the cooking zone is detected in an area manner.

5. A cooking area with a glass ceramic plate (1) and a device for in-service measurement of temperature in at least one cooking zone of a cooking area with a glass ceramic plate, based on an empirically derived correlation between the transmission of light through glass ceramic plate (1) at a wavelength range of the temperature that is typical of the respective plate material, comprising:

a light source (6) that is arranged below the glass ceramic plate (1) and that emits light at a wavelength in the range of 700–1500 nm, optical elements (5, 8) for irradiating glass ceramic plate (1) in a cooking zone (2) from the inside toward the outside with the emitted light, a reflector (9) on the outside surface of plate (1) in cooking zone (2) to reflect light for a second passage through the plate, a photocell arrangement (10) and optical elements (5, 8) placed upstream to detect reflected light, which generates a photocurrent that corresponds to the transmission of glass ceramic plate (1) in cooking zone (2), and an analysis stage (11) for the photocurrent to determine the temperature of cooking zone (2) from the noted correlation between the transmission of the light of the prescribed wavelength and the temperature of glass ceramic plate (1).

6. A cooking area according to claim 5, wherein light source (6) is a light-emitting diode.

7. A cooking area according to claim 6, wherein a device (7) for chopping the emitted light to produce light pulses is provided.

8. A cooking area according to claim 7, wherein the photocell (10) of the arrangement is a phototransistor or a photodiode.

9. A cooking area according to claim 8, wherein fiber optic light guides and/or mirrors are provided as optical elements (5, 8).

10. A cooking area according to claim 9, wherein the optical elements (5, 8) and the photocell arrangement (10) are configured so that the temperature of the cooking zone can be detected in a limited local space.

11. A cooking area according to claim 9, wherein optical elements (5, 8) and the photocell arrangement (10) are configured so that the temperature of the cooking zone can be detected in an area manner.

12. A cooking zone according to claim 11, wherein photocell arrangement (10) has several photoelements, which in each case are assigned to a specific local range of the cooking zone and the temperature of the cooking zone is adapted to be determined by a comparative analysis of the individual photocurrents in an analysis stage (11).

13. A cooking zone according to claim 11, wherein the photocell arrangement has a single photocell (10), to which several fiber optic light guides are assigned as optical elements that are directed to different local areas of the cooking zone.

14. A cooking zone according to claim 12, wherein the analysis stage (11) is configured so that the photocurrent is analyzed in timing and in the timing lag and the information signal is filtered out from the difference.

15. A cooking zone according to claim 5, wherein the same optical elements (5, 8) are provided to irradiate emitted light and to detect reflected light (FIG. 2).

16. A cooking zone according to claim 5, wherein optical elements (5a, 5b) that form different light paths are provided to irradiate emitted light and to detect reflected light (FIG. 3).

17. A cooking zone according to claim 5, wherein the inherent reflection of the glass ceramic surface is used as a reflector instead of a separate component.

18. A cooking zone according to claim 5, wherein reflector (9) is formed by a decorative element on the top side of the glass ceramic plate.

19. A cooking zone according to claim 5, wherein the signal that is obtained in analysis stage (11) for the determined temperature of a display or alarm device or as an actual-value signal is fed to a regulating stage for a heating element (13) that heats cooking zone (2).

* * * * *